United States Patent Office 3,726,858
Patented Apr. 10, 1973

3,726,858
Δ⁴′,⁵′-ANALOGS OF LINCOMYCIN
Robert D. Birkenmeyer, Comstock Township, Kalamazoo County, and Fred Kagan, Kalamazoo, Mich., assignors to The Upjohn Company, Kalamazoo, Mich.
No Drawing. Continuation-in-part of application Ser. No. 864,893, Oct. 8, 1969, now Patent No. 3,574,186, which is a continuation-in-part of application Ser. No. 696,513, Jan. 9, 1968, which is a continuation-in-part of application Ser. No. 511,288, Dec. 1, 1965, which in turn is a continuation-in-part of application Ser. No. 431,184, Feb. 8, 1965, all now abandoned. Said application Ser. No. 864,893 being a continuation-in-part of applications Ser. No. 587,662, Oct. 19, 1966, now abandoned, and Ser. No. 696,518, Jan. 9, 1968, now Patent No. 3,496,163. This application Sept. 3, 1970, Ser. No. 69,436
Int. Cl. C07c 47/18
U.S. Cl. 260—210 R          10 Claims

ABSTRACT OF THE DISCLOSURE

Compounds of the formula:

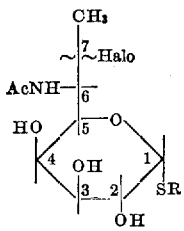

where Ac is the acyl of an acid of the formula

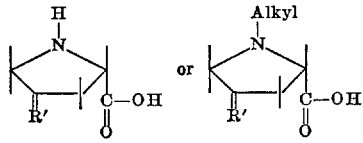

are prepared by replacing by chlorine or bromine the 7-hydroxy of a compound of the formula:

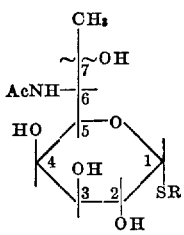

CROSS REFERENCES TO RELATED APPLICATION

This application is a continuation-in-part of our copending application Ser. No. 864,893, filed Oct. 8, 1969, now U.S. Pat. No. 3,574,186, which in turn is a continuation-in-part of our application Ser. No. 693,513, filed Jan. 9, 1968, now abandoned, which in turn is a continuation-in-part of our application Ser. No. 511,288, filed Dec. 1, 1965, now abandoned, which in turn is a continuation-in-part of our application Ser. No. 431,184, filed Feb. 8, 1965, now abandoned. Application Ser. No. 864,893 is also a continuation-in-part of our copending applications Ser. No. 587,662, filed Oct. 19, 1966, now abandoned, and Ser. No. 696,518, filed Jan. 9, 1968, now U.S. Pat. 3,496,163.

BRIEF SUMMARY OF INVENTION

This invention relates to novel compounds of the formula

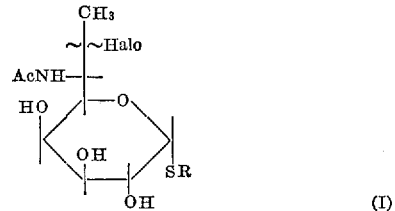

wherein Halo is chlorine or bromine; R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms; and Ac is the acyl radical of a 4-substituted-L-2-pyrrolidine-carboxylic acid of the formula

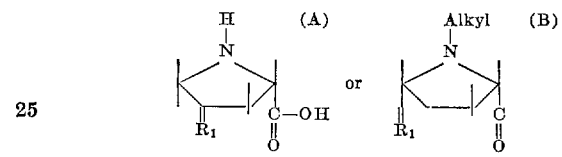

wherein $R_1$ is alkylidene of not more than 20 carbon atoms (including methylene), advanageously not more than 8 carbon atoms, cycloalkylidene of from 3 to not more than 8 carbon atoms, and aralkylidene of not more than 12 carbon atoms, advantageously not more than 8 carbon atoms; and alkyl conains no more than 20 carbon atoms, advantageously not more than 2 carbon atoms. Ac can also be an acyl radical of a 4-substitued-L-2-pyrrolidinecarboxylic acid of the formula:

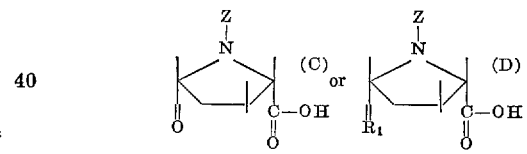

wherein Z is a protective group which can be removed by solvolysis. Suitable such protective groups are trityl, e.g., triphenylmethyl, diphenyl(p-methoxyphenyl)methyl, bis-(p-methoxyphenyl)phenylmethyl, benzyl, or p-nitrobenzyl, and hydrocarboxyloxycarbonyl groups. Examples of the latter are tertiary-butoxycarbonyl; benzyloxycarbonyl groups of the formula:

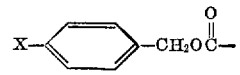

wherein X is hydrogen, nitro, methoxy, chloro, or bromo, for example, carbobenzoxy, p-nitrocarbobenzoxy, p-bromo- and p-chlorocarbobenzoxy; and phenyloxycarbonyl groups of the formula:

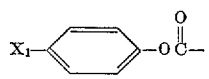

wherein $X_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

Examples of alkyl of not more than 20 carbon atoms, (R and alkyl) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof, examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl. Examples of aralkyl are benzyl, phenethyl, 3-phenylpropyl, and 1-naphthylmethyl. Examples of alkylidene, cycloalkylidene, and aralkylidene groups ($R_1$) include methylene, ethylidene, propylidene, butylidene, pentylidene, hexylidene, heptylidene, octylidene, nonylidene, decylidene, undecyliden, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and 1-naphthylmethylene.

DETAILED DESCRIPTION

The compounds of Formula I were Halo is chlorine can be prepared by replacing by chlorine, the 7-hydroxy of a compound of the formula:

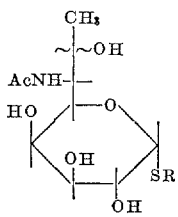

(II)

wherein Ac is the acyl of the acid B, C, or D. The replacement is effected by (1) mixing the starting compound of Formula II with thionyl chloride, (2) heating with thionyl chloride, and (3) solvolysis. This process is described and claimed in our parent application Ser. No. 864,893.

Thionyl chloride without heating converts the compounds of Formula II to a 3,4-O-cyclic sulfite of the formula:

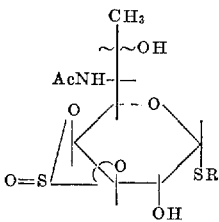

(III)

Heating with thionyl chloride converts compounds of Formulas II and III to a 3,4-O-cyclic sulfite of the formula:

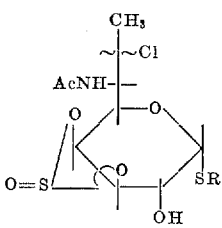

(IV)

and a bis-sulfite of the formula:

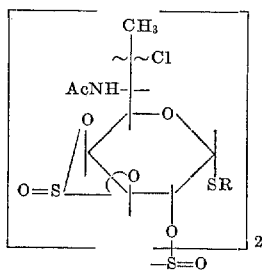

(V)

Solvolysis converts compounds of Formulas IV and V to a 7-chloro-7-deoxylincomycin of the formula.

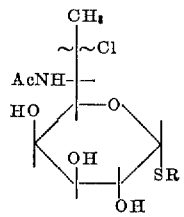

(VI)

wherein Ac is the acyl of the acid A.

The replacement where Halo is chlorine or bromine can also be effected by means of a Rydon reagent. This process is described and claimed in U.S. Pat. 3,496,163. In the process triphenylphosphine is reacted with chlorine or bromine to form triphenylphosphinedihalide which is reacted with the starting compound of Formula II in a suitable solvent such as carbon tetrachloride, chloroform, methylene chloride, ethylene chloride, ether, or benzene. Alternatively a mixture of triphenylphosphine and carbon tetrachloride or carbon tetrabromide can be used as the Rydon reagent, using an excess of the carbon tetrahalide as solvent or another solvent as above.

The Rydon reagent process can also be applied to compounds of Formula III to produce compounds of Formula IV.

Alternatively the compounds of Formula I can be prepared by acylating a compound of the formula:

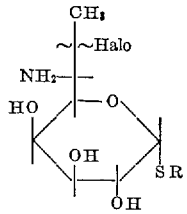

(VII)

where R and Halo are as given above with an acid of Formula B, C, or D. Compounds of Formula VI are prepared by the process of the parent application Ser. No. 864,893 or the process of U.S. Pat. 3,496,163. The acylation can be effected in any suitable manner for example by converting the acid to the mixed anhydride with isobutyl chloroformate as in U.S. Pats. 3,380,992 and 3,496,163.

The starting compounds of Formula II wherein Ac is acyl are prepared by acylating a compound of the formula:

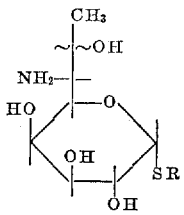

(VIII)

wherein R is as given above, with a 4-substituted-L-2-pyrrolidinecarboxylic acid of Formulas B, C, or D. This acylation and like acylations referred to herein can also be effected by procedures already well known in the art.

The starting acid of Formula A can be prepared by reacting a 4-oxo compound of the formula:

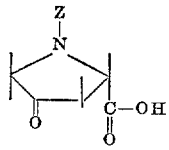

(C)

wherein Z is a protective group which is removable by solvolysis, with a Wittig agent as more particularly described in U.S. Pat. 3,380,992.

Compound C is thus converted to a compound of the formula:

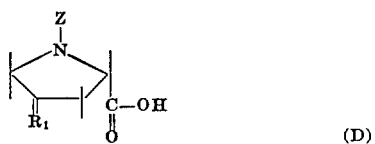

(D)

which on solvolysis is converted to the starting acid of Formula A.

If desired, the starting compounds of Formula II can be acylated with acids of Formula C or D to form compounds 11C and 11D respectively. Compound 11C can then be converted to compound 11D by treatment with a Wittig reagent. Starting acids of Formula B are obtained by treating an acid of Formula D with hydrogen bromide in acetic acid to remove the Z group and then replacing the N-hydrogen with an Alkyl group by alkylation with an alkyl iodide, for example, methyl or ethyl iodide. Compounds of Formula 11D are converted to compounds of Formula IIA and then to compounds of Formula 11B by the same process.

Also where Z is removable by hydrolysis, for example, when Z is tertiary-butoxycarbonyl, compounds of Formulas I and II where Ac is the acyl of the acid of Formula D are converted by hydrolysis to compounds of Formulas I and II wherein Ac is the acyl of acid A.

Any and all of the compounds described in U.S. Pat. 3,380,992 can be converted to the corresponding $\Delta^{4',\alpha}$-7-chloro-7-deoxy and $\Delta^{4',\alpha}$-1-dimethyl-7-chloro-7-deoxy-lincomycins by the process of the invention.

A particularly effective process is to acylate a compound of Formula VI with an acid of Formula D where Z is carbo-t-butoxy.

This acylation step can also be effected by any suitable acylation procedures well known in the art. A suitable such process is to react the 1-(carbo-t-butoxy)-4-alkyl-idene-L-2-pyrrolidenecarboxylic acid with isobutyl chloroformate in a suitable solvent, for example, acetonitrile, in the presence of an acid binding agent, for example, triethylamine, and reacting the alkyl 7-halo-7-deoxy-α-thiolincosaminide (Formula VI) with the mixed anhydride thus formed.

The isobutyl chloroformate advantageously is added to a cooled solution of the acid and acid binding agent and the aminosugar then added. Advantageously a temperature of about 5° C. is maintained throughout the reaction but higher or lower temperatures, say from about —20° to about 25° C. can be used. The alkyl N-(1'-(carbo-t-butoxy)-4'-alkylidene-L-2'-pyrrolidinecarbonyl) - 7 - halo-7-deoxy-α-thiolincosaminide thus formed can be isolated in the usual manner. It is not necessary, however, that it be obtained in a pure form. It is desirable, however, to remove the bulk of the other reaction products and materials, for example, by evaporation to dryness and extraction of the residue with a solvent for the alkyl N-(1'-(carbo-t-butoxy) - 4' - alkylidene-L-2'-pyrrolidenecarbonyl)-7-halo-7-deoxy - α - thiolincosaminide, for example, methylene chloride.

The selective solvolysis step is advantageously accomplished by acid methanolysis. Thus, by subjecting the alkyl N-(1' - (carbo-butoxy) - 4' - alkylidene-L-2-pyrrolidine-carbonyl) - 7 - halo-7-deoxy-α-thiolincosaminide to the acid catalyzed solvolptic action of methanol the carbo-t-butoxy group is cleaved with little or no cleavage of the amide linkage. The acid methanolysis can be effected simply by dissolving the alkyl N-(1'-(carbo-t-butoxy)-4'-alkylidene-L-2'-pyrrolidinecarbonyl) - 7 - halo - 7 - deoxy-α-thiolincosaminide in methanol which is acidified with hydrochloric acid. If desired, gentle heating, for example, on a steam bath, can be used to accelerate the cleavage. The alkyl N-(4'-alkylidene-L-2'-pyrrolidinecarbonyl) - 7-halo-7-deoxy-α-thiolincosaminide (Formula 1A) can be isolated in the usual manner suitable by solvent extractions and crystallization.

It is sometimes desirable to start the process with 1-carbobenzoxy - 4 - alkylidene - L - 2 - pyrrolidinecarboxylic as this material is readily available from 1-carbobenzoxy-4-oxo-L-2-pyrrolidinecarboxylic acid by the procedures described in U.S. Pat. 3,380,992.

The 1-carbobenzoxy group is cleaved by acid cleavage so that the $\Delta^{4',\alpha}$-unsaturation is preserved and the resulting 4-alkylidene-L-2-pyrrolidinecarboxylic acid is N-acylated with an N-carbo-t-butoxylating agent to 1-(carbo-t-butoxy)-4-alkylidene-L-2-pyrrolidinecarboxylic acid.

The acid cleavage can be effected advantageously by dissolving the 1-carbobenzoxy-4-alkylidene-2-pyrrolidine-carboxylic acid in 30% hydrogen bromide-acetic (glacial acetic acid substantially saturated with hydrogen bromide). The cleavage takes place at room temperature (25° C.). The 4-alkylidene-L-2-pyrrolidinecarboxylic acid thus liberated can be separated by the usual method such as solvent extraction and crystallization.

Acylation of the 4-alkylidene-L-2-pyrrolidinecarboxylic acid thus formed with tertiary-butoxy-carbonic acid can be effected with any suitable acylating agent. Advantageously t-butoxy-carbonylazide is used. The reaction can be effected in 50% aqueous dioxane, or like solvent, advantageously in the presence of a weak base such as magnesium oxide. The reaction proceeds at room temperature (25° C.) but mild heating up to about 60° C. can be used if desired. The 1-(carbo-t-butoxy)-4-alkyl-idene-L-2-pyrrolidinecarboxylic acid thus obtained can be isolated by the usual procedures. It is not necessary to the process, however, that it be recovered in a pure state as the subsequent steps can be performed on a crude product. Ordinarily, it will be sufficient to remove the bulk of the extraneous material by extraction in a solvent such as ethyl acetate and evaporation of the solvent.

The compounds of the invention (Formula I) exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluorosilicic, hexafluoroarsenic, hexafluorophosphoric, acetic, succinic, citric, lactic, maleic, fumaric, pamoic, cholic palimitic mucic, camphoric, glutaric, glycolic, phthalic, tartaric, lauric stearic, salicylic, 3-phenylsalicylic, 5-phenylsalicylic, 3-methylglutaric, orthosulfobenzoic, cyclopentanepropionic, 1,2-cyclohex-anedicarboxylic, 4-cyclohexanecarboxylic, octadecenylsuc-cinic, octenylsuccinic, methanesulfonic, benzenesulfonic, helianthic, Reinecke's, dimethyldithiocarbamic, cyclohex-ylsulfamic, hexadecylsulfamic, octadecylsulfamic, sorbic, monochloroacetic, undecylenic, 4'-hydroxyazobenzene-4-sulfonic, octyldecylsulfuric, pricric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid soluton or converted to another salt by metathesis. The free bases can be used as a buffer or as an antacid. The compounds of Formula I also react with isocyanates to form urethanes and can be used to modify polyurethane resins. The long chain compounds, i.e., where $R_1$ is alkyl of from 8 carbon atoms up, having surface active properties can be used as wetting and emulsifying agents. The thiocyanic acid addition salt when condensed with formaldehyde forms resinous material useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid addition salts are useful as parasiticides according to U.S. Pats. 3,122,536 and 3,122,552.

Methyl N - (4' - propylidene-L-2-pyrrolidinecarbonyl)-7-halo-7-deoxy-α-thiolincosaminide and its close analogues, i.e., where $R_1$ contains not more than 8 carbon atoms and R and alkyl are methyl or ethyl, have antibacterial properties similar to lincomycin and can be used for the same purposes as lincomycin. The other analogues and isomers also show anti-bacterial properties and can likewise be used to treat infections in animals due to Gram positive organisms.

The following examples are illustrative of the process and products of the present invention but are not to be construed as limiting. The parts and percentages are by weight and the solvent ratios are by volume unless otherwise specified.

EXAMPLE 1

Δ$^{4'α}$-1-demethyl-7(S)-chloro-7-deoxylincomycin hydrochloride

A–1.—4-propylidene-L-2-pyrrolidinecarboxylic acid

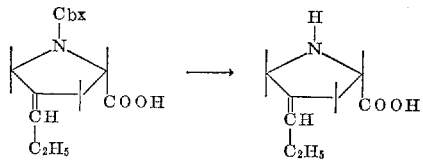

A quantity of 18.9 g. of 1-barbobenzoxy-4-propylidene-L-2-pyrrolidinecarboxylic acid is dissolved in 59 ml. of 30% hydrogen bromide-acetic acid. After 35 min. the reaction mixture is diluted with 1400 ml. of anhydrous ether. After standing for 3 hrs. the ether is decanted and 1 liter of fresh ether added. After stirring for 3 hrs. 12.3 g. of 4-propylidene-L-2-pyrrolidinecarboxylic acid hydrobromide is recovered by filtration. This product is dissolved in 30 ml. of water and passed over a column of 135 g. of cage resin. There is recovered 7.7 g. of 4-propylidene-L-2-pyrrolidinecarboxylic acid by lyophilization of the effluent. This material is crystallized from methanol-ethyl acetate to give 3.0 g. of 4-propylidene-L-2-pyrrolidinecarboxylic acid, M.P. 202–208° C.

A portion on recrystallization from the same solvent affords an analytical sample, M.P. 220–228° C. dec., [α]$_D$ —51° (H$_2$O).

Analysis.—Calcd. for $C_8H_{13}NO_2$ (percent): C, 61.91; H, 8.44; N, 9.03. Found (percent): C, 61.78; H, 8.67; N, 8.96.

Cage resins are ion retardation resins obtained by polymerizing acrylic acid in strongly basic quaternary ammonium cross-linked polystyrene anion exchange resin. Kirk-Othner, Encyclopedia of Chemical Technology, Vol. 11, p. 876, 2d ed., for example Retardation 11 A8 and Bio-Rad A6–1 resins.

B–1.—1-(carbo-t-butoxy) - 4 - propylidene-L-2-pyrrolidinecarboxylic acid

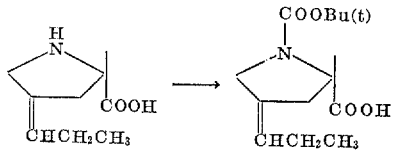

A mixture of 4.0 g. of 4-propylidene-L-2-pyrrolidinecarboxylic acid, 2.07 g. of MgO, and 7.37 g. of t-butoxycarbonylazide in 100 ml. of 50% aq. dioxane is stirred at ambient temperature for 96 hrs. The mixture is diluted with 150 ml. of water and then extracted three times with ethyl acetate. The cooled aqueous solution is acidified to pH 5 by the addition of 10% citric acid solution. On extraction with three portions of ethyl acetate followed by drying and evaporation of the solution 3.6 g. (54.9%) of crude 1 - (carbo-t-butoxy)-4-propylidene-L-pyrrolidinecarboxylic acid is obtained as an oily residue. This material is used directly in the next step.

C–1.—Methyl 7 - deoxy - 7(S)-chloro-α-thiolincosaminide.

C–1a.—To a suspension of 197.2 g. of triphenylphosphine in 1.5 l. of anhydrous acetonitrile is added 52.5 g. of chlorine. With stirring, 18.75 g. of methyl α-thiolincosaminide (U.S. Pat. 3,179,565) is added. After 2.5 hrs. at ambient temperature, 50 ml. of methanol is added. The mixture is concentrated to a thick syrup. The concentrate is diluted with methylene chloride and extracted three times with water. The aqueous extracts are washed twice with methylene chloride. The extracts are made alkaline with sodium hydroxide and extracted repeatedly with methylene chloride. The organic extract is dried and evaporated under vacuum. The residue is chromatographed over 1.1 kg. of silica gel using chloroform-methanol (4:1) for elution. The major fraction selected on the basis of its TLC (thin layer chromatography) profile weighs 4.4 g. Recrystallization from methanol-water affords 2.73 g. of methyl 7(S)-chloro-7-deoxy-α-thiolincosaminide, M.P. 178–181° C.

Analysis.—Calcd. for $C_9H_{18}ClNO_4S$ (percent): C, 39.77; H, 6.67; N, 5.16; S, 11.80; Cl, 13.05. Found (percent): C, 39.91; H, 7.02; N, 5.57; S, 11.99; Cl, 13.33.

C–1b.—A mixture of 1.0 g. of methyl α-thiolincosaminide, 3.0 g. of triphenylphosphine, 10 ml. of carbon tetrachloride, and 100 ml. of acetonitrile is heated at reflux for 3 hrs. The reaction mixture is evaporated to dryness under vacuum and the residue purified by chromatography over 500 g. of silica gel using a solvent system composed of chloroform and methanol (4:1). The product fractions (as determined by TLC) are collected, combined, and evaporated to a white solid. On recrystallization from ethanol, there is obtained 250 mg. (23.3%) of crystals of methyl 7(S)-chloro-7-deoxy-α-thiolincosaminide, M.P. 169–172° C. having a I.R. identical with the product of Part C–1a.

D–1.—Methyl N - (1' - (carbo-t-butoxy)-4'-propylidene - L - 2' - pyrrolidinecarbonyl)-7-deoxy-7(S)-chloro-α-thiolincosaminide

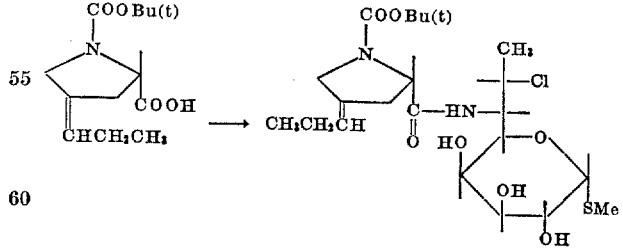

To a solution of 3.6 g. of 1-(carbo-t-butoxy)-4-propylilene-L-2-pyrrolidinecarboxylic acid and 1.96 ml. of triethylamine in 90 ml. of acetonitrile cooled to 50° C. is added 1.8 ml. of i-butyl chloroformate. After 30 min. a solution of 3.82 g. of methyl 7(S)-chloro-7-deoxy-α-thiolincosaminide in 40 ml. of water and 40 ml. of acetone is added. After stirring for 4 hrs., the acetonitrile is distilled under vacuum and the product recovered by extraction with methylene chloride. After drying and evaporation of the solvent methyl N-(1'-(carbo-t-butoxy)-4'-propylidene-L-2 - pyrrolidinecarbonyl) - 7(S) - chloro-7-deoxy-α-thiolincosaminide is obtained as a glassy residue which is used in the next step.

E-1.—Δ⁴',ᵅ-1'-demethyl-7(S) - chloro - 7 - deoxylincomycin hydrochloride

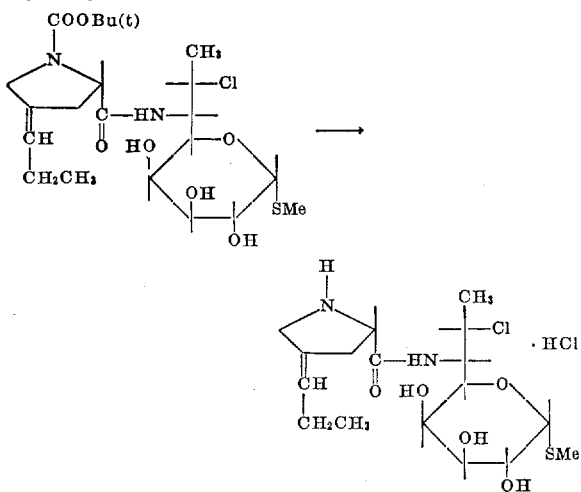

A solution of 9.8 g. of methyl N-(1'-carbo-t-butoxy)-4'-propylidne-L - 2' - pyrrolidinecarbonyl)-7(S)-chloro-7-deoxy-α-thiolincosaminide in 25 ml. of methanol and 20 ml. H₂O is acidified with 1.8 ml. of 6 N hydrochloric acid and warmed for 1 hr. on the steam bath. The methanol is distilled in vacuo and the aqueous solution extracted with methylene chloride. The aqueous extract is acidified with 6 N HCl and extracted 3 times with 25 ml. portions of MeCl₂. The combined extract is dried and evaporated to give a residue of 2.336 g. This is warmed with 10 ml. of acetone from which precipitates 300 mg. of product as the free base, M.P. 165–171° C. The acetone soluble filtrate is acidified with 6 N HCl. Crystalline hydrochloride salt, M.P. 177–185° C. dec., and weighing 1.4 g. precipitates.

This solid is crystallized from 15 ml. of acetonitrile and 5 ml. of methanol to yield 1.15 g. of Δ⁴',ᵅ-1'-demethyl-7(S)-chloro-7-deoxylincomycin hydrochloride, M.P. 175–185° C. dec.

*Analysis.*—Calcd. for C₁₇H₂₉N₂O₅SCl·HCl (percent): C, 45.84; H, 6.79; N, 6.29; S, 7.20; Cl, 15.92. Found (percent): C, 45.42; H, 7.08; N, 6.05; S, 7.09; Cl, 15.77. (Corrected for 4.16% H₂O determined by Karl Fischer analysis.)

By substituting the 1-carbobenzoxy-4-propylidene-L-2-pyrrolidinecarboxylic acid of Example 1 by 1-carbobenzoxy-4-butylidene-L-2-pyrrolidinecarboxylic acid, 1-carbobenzoxy - 4 - pentylidene-L-2-pyrrolidinecarboxylic acid, 1-carbobenzoxy - 4 - hexylidene-L-2-pyrrolidinecarboxylic acid, 1-carbobenzoxy-4-octylidene-L-2-pyrrolidinecarboxylic acid, 1-carbobenzoxy-4-cyclohexylidene-L-2 - pyrrolidinecarboxylic acid, and 1 - carbobenzoxy - 4-benzylidene-L-2-pyrrolidinecarboxylic acid there are obtained 4-butylidene-L-2-pyrrolidinecarboxylic acid, 4-pentylidene-L-2-pyrrolidinecarboxylic acid, 4-hexylidene-L-2-pyrrolidinecarboxylic acid, 4-octylidene-L-2-pyrrolidinecarboxylic acid, 4-cyclohexylidene-L-2-pyrrolidinecarboxylic acid, and 4-benzylidene-L-2-pyrrolidinecarboxylic acid; 1-(carbo-t-butoxy)-4-butylidene-L-2-pyrrolidinecarboxylic acid, 1-(carbo-t-butoxy)-4-pentylidene-L-1-pyrrolidinecarboxylic acid, 1-(carbo-t-butoxy)-4-hexylidene-L-2-pyrrolidinecarboxylic acid, 1 - (carbo-t-butoxy) - 4-octylidene-L - 2 - pyrrolidinecarboxylic acid, 1-(carbo-t-butoxy)-4-cyclohexylidene-L-2-pyrrolidinecarboxylic acid, and 1 - (carbo-t-butoxy) - 4-benzylidene-L-2-pyrrolidinecarboxylic acid; methyl N-(1'-(carbo-t-butoxy)-4'-butylidene-L-2'-pyrrolidinecarbonyl)-7(S) - chloro-7-deoxy-α-thiolincosaminide, methyl N-(1' - (carbo-t-butoxy) - 4'-pentylidene - L - 2' - pyrrolidinecarbonyl)-7(S)-chloro-7-deoxy-α-thiolincosaminide, methyl N-(1'-(carbo-t-butoxy) - 4' - hexylidene-L-2'-pyrrolidinecarbonyl) - 7(S)-chloro-7-deoxy-α-thiolincosaminide, methyl N-(1'-(carbo-t-butoxy) - 4 - octylidene-L-2'-pyrrolidinecarbonyl)-7(S)- chloro-7-deoxy-α-thiolincosaminide, methyl N-(1'-(carbo-t-butoxy) - 4' - cyclohexylidene-L-2'-pyrrolidinecarbonyl)-7(S) - chloro - 7 - deoxy-α-thiolincosaminide, and methyl N-(1'-(carbo-t-butoxy)-4'-benzylidene-L-2' - pyrrolidinecarbonyl)-7(S) - chloro - 7 - deoxy-α-thiolincosaminide; methyl N-(4'-butylidene-L-2'-pyrrolidinecarbonyl)-7(S)-chloro-7-deoxy-α-thiolincosaminide, methyl N-(4'-pentylidene-L-2'-pyrrolidinecarbonyl) - 7(S) - chloro-7-deoxy-α-thiolincosaminide, methyl N-(4'-hexylidene-L-2'-pyrrolidinecarbonyl)-7(S) - chloro - 7 - deoxy-α-thiolincosaminide, methyl N - (4' - octylidene-L-2'-pyrrolidinecarbonyl)-7(S)-chloro - 7 - deoxy-α-thiolincosaminide, methyl N-(4'-cyclohexylidene-L-2'-pyrrolidinecarbonyl)-7(S)-chloro-7-deoxy-α-thiolincosaminide, and methyl N-(4'-bonzylidene-L-2'-pyrrolidinecarbonyl) - 7(S) - chloro - 7-deoxy-α-thiolincosaminide.

By substituting the chlorine in part C-1 by bromine the corresponding 7(S)-bromo-7-deoxy compounds are obtained. By substituting the carbon tetrachloride of part C-2 by carbon tetraiodide, the corresponding 7(S)-iodo-7-deoxy compounds are obtained.

By substituting the methyl α-thiolincosaminide of part C by ethyl and higher alkyl α-thiolincosaminides (U.S. Pat. 3,380,992) there are obtained the corresponding ethyl and higher alkyl N-(4'-alkylidene-L-2'-pyrrolidinecarbonyl)-7(S)-halo-7-deoxy - α - thiolincosaminides and the corresponding ethyl and higher alkyl N-(1'-(carbo-t-butoxy)-4'-alkylidene-L-2' - pyrrolidinecarbonyl)-7-(S)-7-deoxy-α-thiolincosaminide.

By substituting the methyl α-thiolincosaminide of part C by methyl and higher alkyl 7-epi-α-thiolincosaminides (U.S. Pat. 3,380,992) there are obtained the corresponding methyl and higher alkyl N-(4'-alkylidene-L-2'-pyrrolidinecarbonyl)-7(R)-halo-7-deoxy - α - thiolincosaminides and the corresponding N-(1'-(carbo-t-butoxy)-4'-alkyliene-L-2'-pyrrolidinecarbonyl-7(R)-halo - 7 - deoxy-α-thiolincosaminides.

EXAMPLE 2

Δ⁴',ᵅ-7(S)-chloro-7-deoxylincomycin [methyl 7-chloro-6,7,8-trideoxy-6-(1'-methyl - 4' - propylidene-L-2-pyrrolidinecarboxamido) - 1 - thio-L-threo-α-D-galactooctopyranoside]

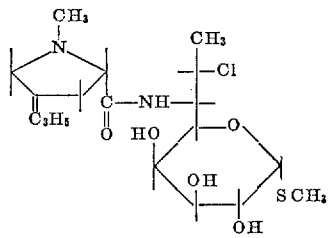

A-2.—The free base: A suspension of 2.3 g. (0.005 mole) Δ⁴',ᵅ-lincomycin hydrochloride in 50 ml. of carbon tetrachloride is stirred well at 25° C. under nitrogen. 9 ml. of thionyl chloride is added all at once and stirring continued for 2 hrs. During this period the solid dissolves and a clear solution is obtained. The reaction mixture is heated at reflux for 2 hrs., the heat source then removed and nitrogen bubbled into the amber solution until the pot temperature drops to 25$ C. About 40 ml. of liquid is removed via vacuum distillation at a pot temperature of less than 35° C. The yellow solid which precipitated during this distillation is collected and dried. This solid is dissolved in about 3 ml. of methanol, cooled at 25° C., made basic (pH 11) with dilute aqueous sodium hydroxide solution (2 N), diluted to about 12 ml. with water and extracted well with ether. The ether extracts are combined, washed with a small amount of water, dried over anhydrous magnesium sulfate and filtered. On evaporation of an aliquot of the combined ether extract Δ⁴',ᵅ-7(S)-chloro-7-deoxylincomycin free base is obtained as a yellow amorphous solid.

B-2.—The hydrochloride: Addition of hydrogen chloride gas to the filtrate of part A results in the precipitation of Δ⁴',ᵃ-7(S)-chloro-7-deoxylincomycin hydrochloride which is separated and recrystallized from ethanol and ethyl acetate as a white crystalline solid.

EXAMPLE 3

Methyl Δ⁴',ᵃ-7-chloro-6,7,8-trideoxy-6-(1'-ethyl-4'-propylidene-L-2-pyrrolidinecarboxamido) - 1 - thio-L-threo-α-D-galacto-octopyranoside

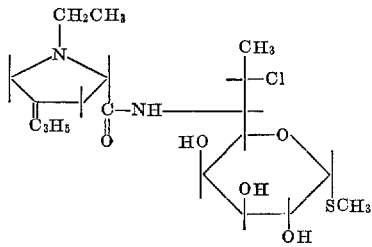

A–3.—Δ⁴',ᵃ-1'-demethyl-7(S)-chloro - 7 - deoxylincomycin free base: Δ⁴',ᵃ-1'-demethyl-7(S)-chloro-7-deoxylincomycin hydrochloride (Part E–1), 300 mg. is dissolved in 50 ml. of water. The pH of the solution is adjusted to 9.4 by using an anion exchange resin in the hydroxide form. The resin is obtained by chloromethylating by the procedure given on pages 88 and 97 of Kunin, Ion Exchange Resins, 2nd ed. (1958), John Wiley & Sons, Inc., polystyrene cross-linked, if desired, with divinylbenzene, prepared by the procedure given on page 84 of Kunin, supra, and quaternizing with trimethylamine or dimethylethanolamine, by the procedure given on page 97 of Kunin, supra. The alkaline solution is then freeze-dried to give Δ⁴',ᵃ-1'-demethyl-7(S)-chloro-7-deoxylincomycin free base.

B–3.—Δ⁴',ᵃ-1'-demethyl-1'-ethyl-7(S)-chloro - 7 - deoxylincomycin hydrochloride: Δ⁴',ᵃ-1'-demethyl-7(S)-chloro-7-deoxylincomycin free base (part A–3) is dissolved in 20 ml. of methylene chloride and 3 ml. of methanol. After 3 ml. of ethyl iodide and 2 ml. of triethylamine are added, the mixture is allowed to stand at room temperature for 2 hours at which time 5 ml. of ethyl iodide and 3 ml. of triethylamine are added. The reaction mixture is held at 40° C. for 3 hours, after which it is concentrated to dryness. The residue is dissolved in 30 ml. of water, the pH adjusted to 10.0 with 1 N aqueous sodium hydroxide, and the alkaline solution then extracted three times with methylene chloride. The methylene chloride extracts are concentrated to dryness and the residue dissolved in methanolic hydrogen chloride. This solution is mixed with 3 ml. of acetone and 100 ml. of ether to precipitate Δ⁴',ᵃ-1'-demethyl-1'-ethyl-7(S)-chloro-7-deoxylincomycin hydrochloride which is separated by filtration and dried.

By substituting the ethyl iodide by methyl iodide there is obtained Δ⁴',ᵃ-7(S)-chloro-7-deoxylincomycin hydrochloride identical with that of part B–2.

We claim:
1. A compound of the formula

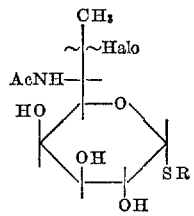

wherein Halo is chlorine or bromine; R is alkyl of not more than 20 carbon atoms, cycloalkyl of from 3 to not more than 8 carbon atoms, and aralkyl of not more than 12 carbon atoms, and Ac is the acyl radical of a 4-substituted-L-2-pyrrolidinecarboxylic acid of the formula

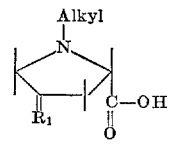

wherein $R_1$ is alkylidene of not more than 20 carbon atoms (including methylene), cycloalkylidene of from 3 to not more than 8 carbon atoms, and aralkylidene of not more than 12 carbon atoms; and Alkyl contains not more than 20 carbon atoms.

2. A compound according to claim 1 in which $R_1$ contains not more than 8 carbon atoms and R and Alkyl are methyl or ethyl.

3. A compound according to claim 2 in which Halo is chlorine.

4. A compound according to claim 2 in which Halo is 7(S)-chloro.

5. A compound of claim 4 in which $R_1$ is propylidene.

6. A compound of the formula

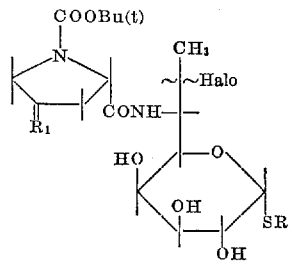

where Halo is chlorine or bromine; R is alkyl of not more than 12 carbon atoms; and $R_1$ is alkylidene of not more than 20 carbon atoms, cycloalkylidene of 3 to not more than 8 carbon atoms, and aralkylidene of not more than 12 carbon atoms.

7. A compound according to claim 6 in which $R_1$ contains not more than 8 carbon atoms and R is methyl or ethyl.

8. A compound according to claim 7 in which Halo is chlorine.

9. A compound according to claim 7 in which Halo is 7(S)-chloro.

10. A compound of claim 9 in which $R_1$ is propylidene.

References Cited

UNITED STATES PATENTS 3,418,414  12/1968  Houtman _____ 260—210 R
3,555,007  1/1971  Magerlein _____ 260—210 R LEWIS GOTTS, Primary Examiner J. R. BROWN, Assistant Examiner U.S. Cl. X.R.

260—326.3, 2.5, 999; 252—357

UNITED STATES PATENT OFFICE
CERTIFICATE OF CORRECTION

Patent No. 3,726,858  Dated April 10, 1973

Inventor(s) Robert D. Birkenmeyer and Fred Kagan

It is certified that error appears in the above-identified patent and that said Letters Patent are hereby corrected as shown below:

Column 1, line 63, for "693,513" read -- 696,513 --.
Column 2, line 33, for "alkyl conains no" read -- Alkyl contains not --; Column 5, line 67, for "solvolptic" read -- solvolytic --. Column 6, line 73, for "soluton" read -- solution --. Column 8, line 10, for "L-pyrrolidine" read -- L-2-pyrrolidine --. Column 9, line 1, for "\" read -- △ --. Column 10, line 14, for "bonzylidine" read -- benzylidine --; Column 10, line 61, for "25$ C." read -- 25° C. --.

Column 2, lines 21-27 should read as follows:

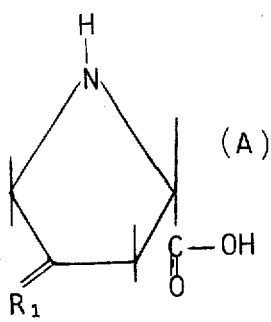 or 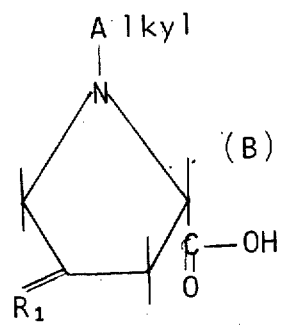

UNITED STATES PATENT OFFICE
CERTIFICATE OF CORRECTION

Patent No. 3,726,858         Dated April 10, 1973

Inventor(s) Robert D. Birkenmeyer and Fred Kagan    Page - 2

It is certified that error appears in the above-identified patent and that said Letters Patent are hereby corrected as shown below:

Column 2, lines 37-43 should read as follows:

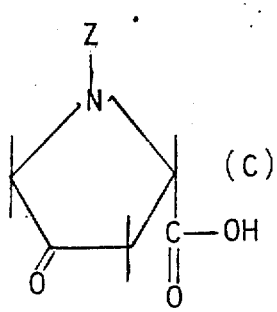    or    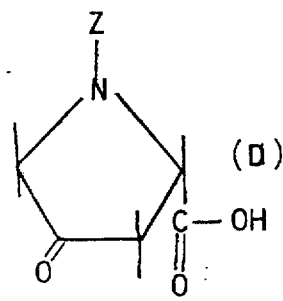

Column 4, line 11, for "(VI)" read -- (I) --; column 4, line 39, for "(VII)" read -- (VI) --. Column 7, lines 34-40 should read as follows:

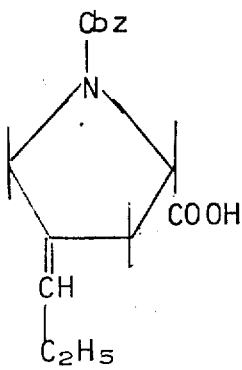  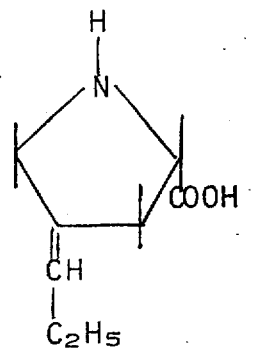

Signed and sealed this 1st day of January 1974.

(SEAL)
Attest:

EDWARD M. FLETCHER, JR.            RENE D. TEGTMEYER
Attesting Officer                  Acting Commissioner of Patents